(12) United States Patent
Kuruva

(10) Patent No.: US 11,567,571 B2
(45) Date of Patent: Jan. 31, 2023

(54) REMOTE CONTROL OF A DEVICE VIA A VIRTUAL INTERFACE

(71) Applicant: AUTODESK, INC., San Francisco, CA (US)

(72) Inventor: Keshav Prasad Kuruva, San Francisco, CA (US)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 16/867,497

(22) Filed: May 5, 2020

(65) Prior Publication Data

US 2021/0349537 A1    Nov. 11, 2021

(51) Int. Cl.
| | |
|---|---|
| G06K 9/00 | (2022.01) |
| G06F 3/01 | (2006.01) |
| G06F 3/04815 | (2022.01) |
| H04W 4/30 | (2018.01) |
| H04L 12/403 | (2006.01) |
| G06V 20/20 | (2022.01) |

(52) U.S. Cl.
CPC .......... *G06F 3/014* (2013.01); *G06F 3/04815* (2013.01); *G06V 20/20* (2022.01); *H04L 12/403* (2013.01); *H04W 4/30* (2018.02)

(58) Field of Classification Search
CPC ...... G06F 3/014; G06F 3/04815; H04W 4/30; G06K 9/00671; H04L 12/403; H04L 12/2803; H04L 12/2818
See application file for complete search history.

(56) References Cited

U.S. PATENT DOCUMENTS

| | | | |
|---|---|---|---|
| 2003/0038730 A1* | 2/2003 | Imafuku | H04L 67/12 340/4.3 |
| 2003/0171113 A1* | 9/2003 | Choi | H04L 12/2818 455/420 |
| 2018/0157398 A1* | 6/2018 | Kaehler | G06F 3/017 |
| 2020/0174566 A1* | 6/2020 | Klein | G06F 3/04883 |

OTHER PUBLICATIONS

Consumer/Tyndall & TSSG; Virtual Reality Smart Glove; date unknown; 9 pages.

* cited by examiner

*Primary Examiner* — Christopher E Leiby
(74) *Attorney, Agent, or Firm* — Artegis Law Group, LLP

(57) ABSTRACT

A technique for controlling a target device via a virtual interface, the method including receiving a control input from a virtual interface, determining a control signal based on the control input for an operation to be performed by a first device that is configured to be controlled wirelessly, and transmitting the control signal to the first device to cause the first device to perform the operation.

18 Claims, 7 Drawing Sheets

REMOTE CONTROL OF A DEVICE VIA A VIRTUAL INTERFACE

BACKGROUND

Field of the Various Embodiments

The various embodiments relate generally to computer science and computer architecture and, more specifically, to controlling a device remotely via a virtual interface.

Description of the Related Art

Being able to control mechanical and electrical devices remotely enables a user to operate those devices without physically touching or otherwise interacting with the devices. From consumer devices (e.g., televisions, stereos, video drones) to industrial devices (e.g., construction boom lifts, robotic manipulators), the ability to control devices remotely greatly facilitates the operation of such devices. Further, controlling certain types of devices remotely is necessary for those devices to perform their essential functions. For example, in the case of a video drone or a manipulator located in a hazardous environment, all operations have to be performed remotely.

Depending on the specific design and application of a remotely controlled device, control signals can be communicated to the device via a wired or a wireless connection. In either case, a user typically generates the control signals via an input device, such as a hand-held controller or control console, specifically designed for generating the relevant control signals. The input device enables a user to operate a remotely controlled device without having to physically contact the device or be in the same environment as the device.

One drawback to remotely controlling a device is that, in order to generate control signals for the device, a user has to have a suitable input device for the remotely controlled device or be physically present in the location where a suitable input console for the remotely controlled device resides. Thus, the ability for a user to remotely control the device is limited by the availability of or access to a suitable input device or input console.

As the foregoing illustrates, what is needed in the art are more effective ways to control devices remotely.

SUMMARY

One embodiment of the present sets forth a technique for controlling a device via a virtual interface, the method including receiving a control input from a virtual interface, determining a control signal based on the control input for an operation to be performed by a first device that is configured to be controlled wirelessly, and transmitting the control signal to the first device to cause the first device to perform the operation.

At least one technical advantage of the disclosed techniques relative to the prior art is that the disclosed techniques enable a user to remotely control a target device without having to possess a specialized controller for the target device or have access to an input console for the target device. Another advantage of the disclosed techniques is that the user can receive information associated with the target device without possessing a specialized controller for the target device or having access to an input console for the target device. Such information can include setpoints or other operational parameters for the target device and/or measurements performed by the target device. These technical advantages represent one or more technological improvements over prior art approaches.

BRIEF DESCRIPTIONS OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

Figure 6:
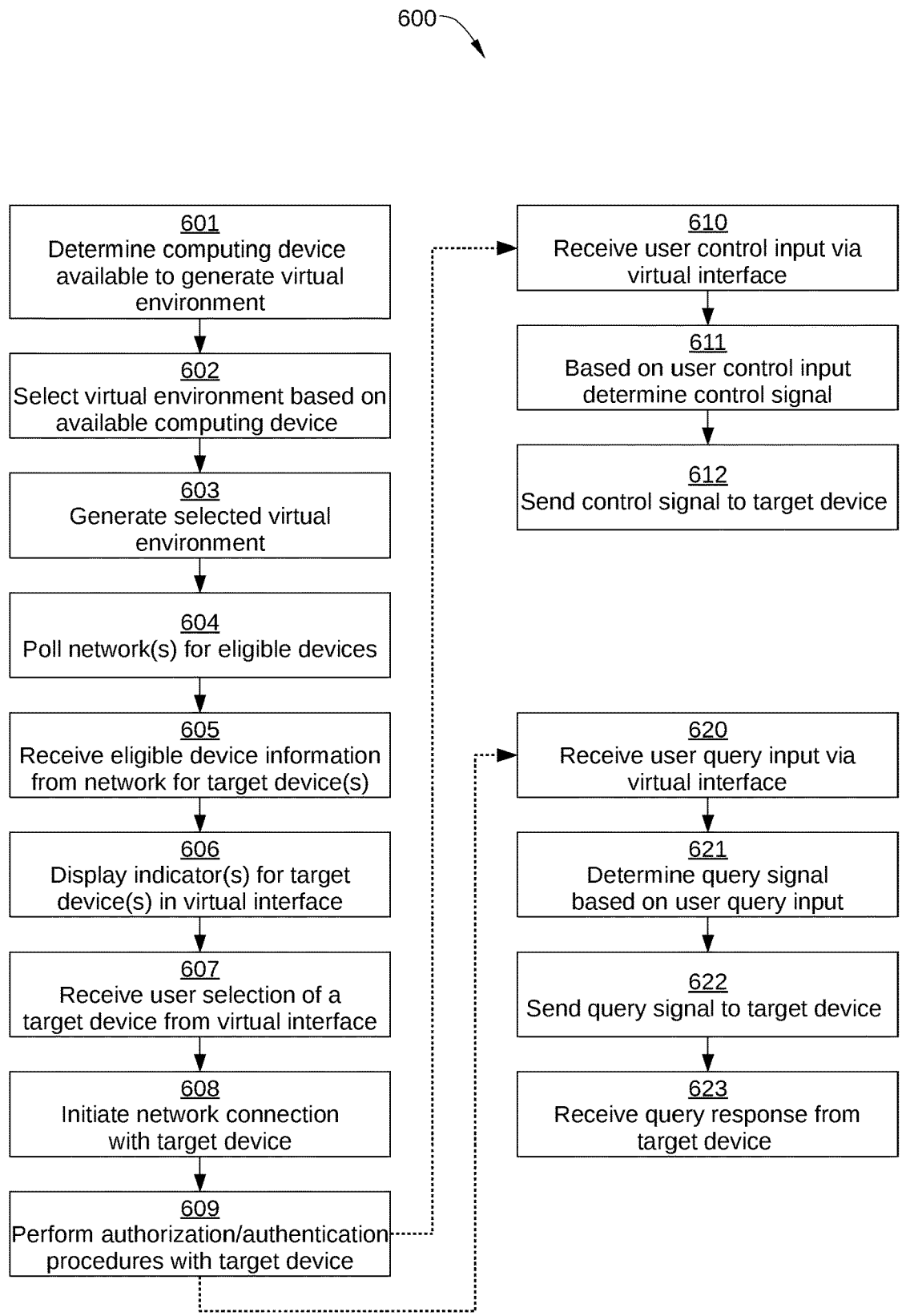
Figure 7:
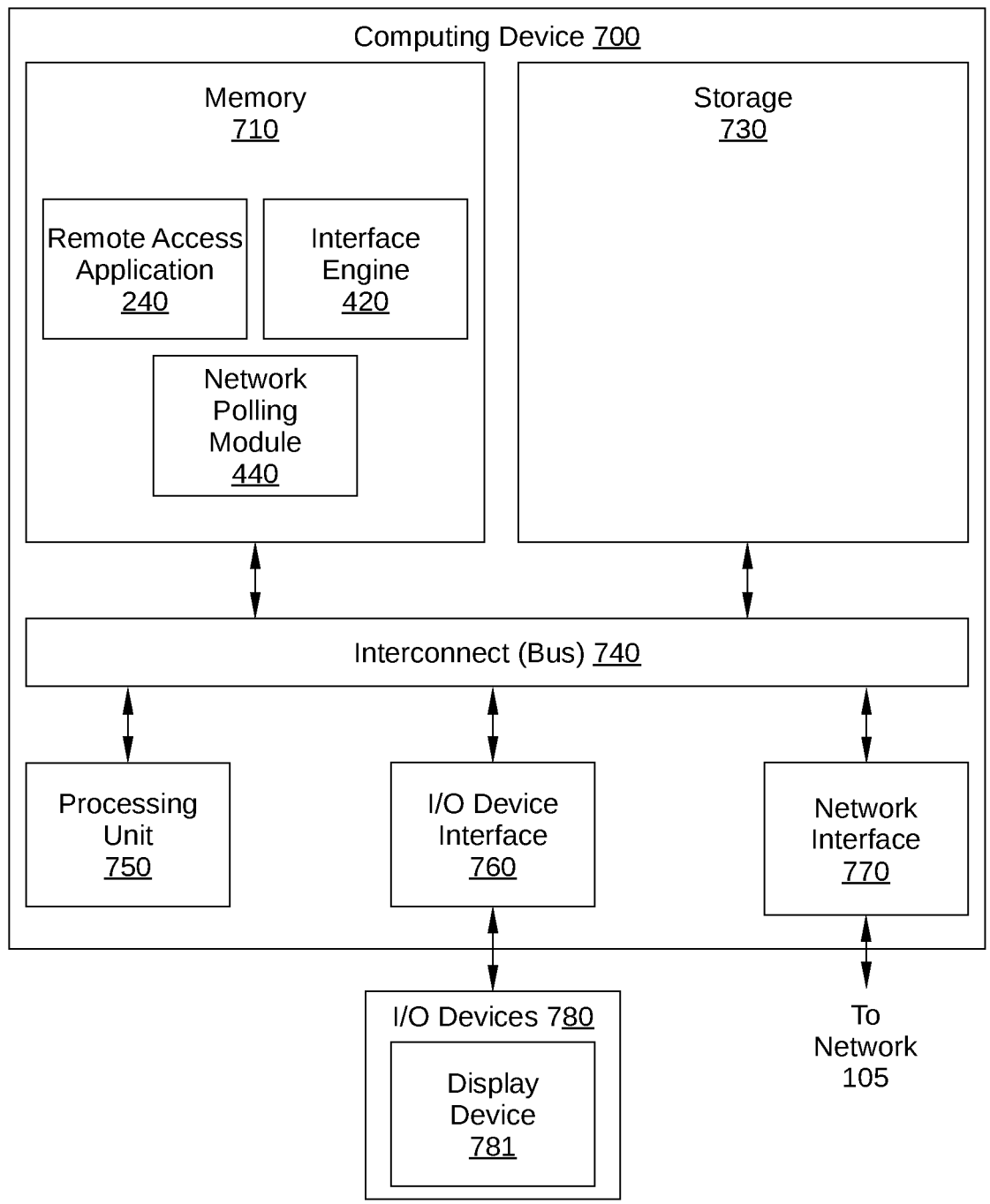

FIG. 6 sets forth a flowchart of method steps for controlling a device via a virtual interface, according to various embodiments; and FIG. 7 is a block diagram of a computing device configured to implement one or more aspects of the present disclosure.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the embodiments. However, it will be apparent to one of skill in the art that the embodiments may be practiced without one or more of these specific details.

System Overview

Figure 1:
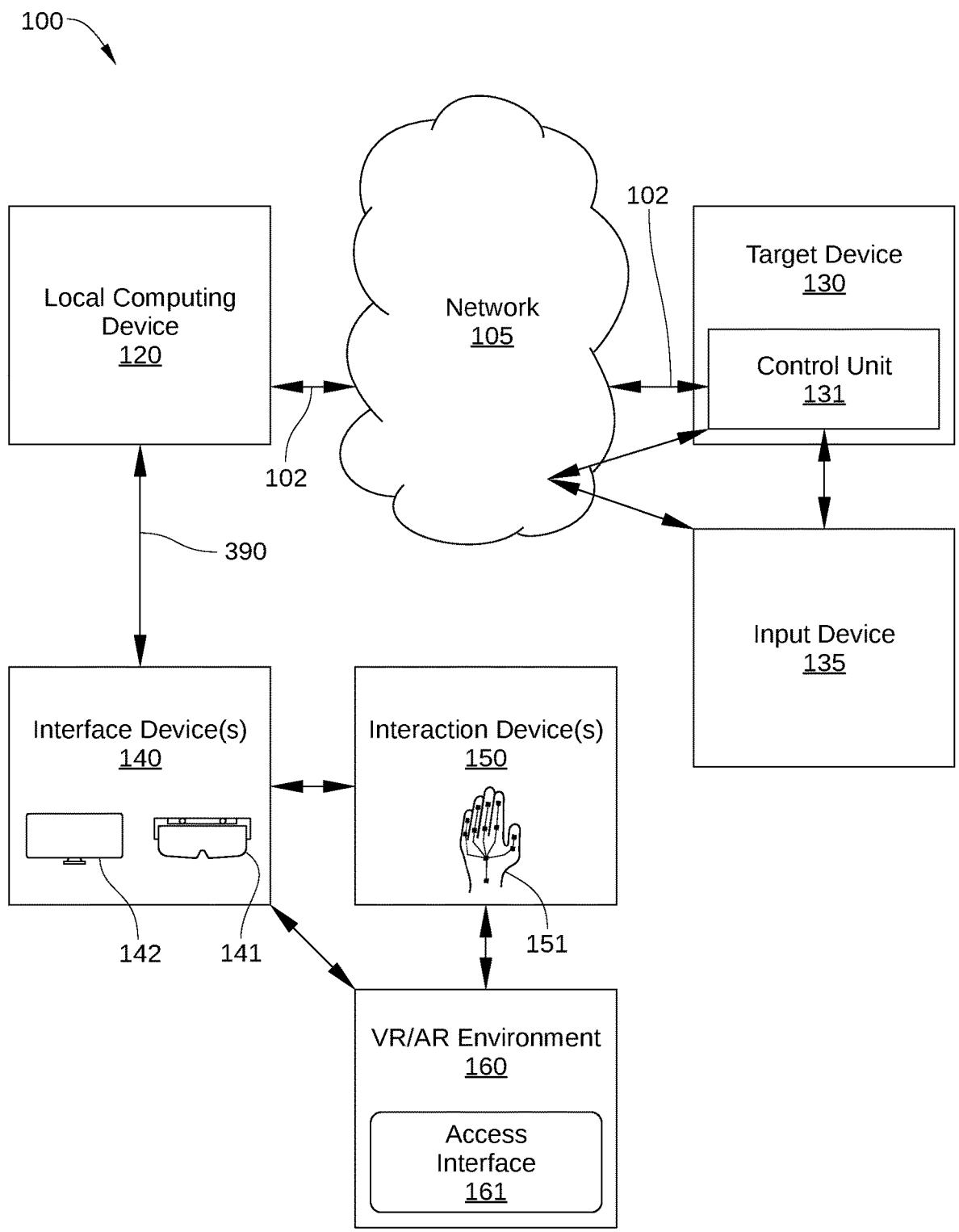
FIG. 1 illustrates a remote device control system configured to implement one or more aspects of the various embodiments.

FIG. 1 illustrates a remote device control system 100 configured to implement one or more aspects of the embodiments. Remote device control system 100 is configured to enable a user to remotely control and otherwise interact with a target device 130 via a virtual environment, such as a virtual reality (VR) or augmented reality (AR) environment 160 that is locally available to the user. VR/AR environment 160 includes an interface that is tailored to a specific target device 130 and enables user inputs to cause target device 130 to perform certain functions. As a result, a user can remotely cause target device 130 to perform some or all functions that are normally performed with a specialized remote controller for target device 130. Thus, even though the user does not have access to the specialized remote controller, the user can operate target device 130.

Remote device control system 100 includes a local computing device 120, one or more interface devices 140 that are configured to generate VR/AR environment 160, and one or more interaction devices 150. As shown, local computing device 120 and target device 130 are each communicatively connected to a network 105. Network 105 can be any technically feasible type of communications network that allows data to be exchanged between local computing device 120 and external entities or devices, such as target device 130, a web server, or another networked computing device (not shown). For example, network 105 may include a wide area network (WAN), a local area network (LAN), a wireless (WiFi) network, a Bluetooth network and/or the Internet, among others.

Target device 130 can include any mechanical or electronic device that is configured to be connected to a network 105 and to be remotely controlled. For instance, in some embodiments, target device 130 is configured to be controlled with a specially designed input device 135, such as a hand-held input device or input console, and includes a control unit 131, such as a computing device. Target device 130 is communicatively coupled to network 105 and to input device 135, and is configured to receive control signals from network 105 and from input device 135.

In some embodiments, target device 130 is a network-connected industrial device, such as a fan, pump, generator, material manipulator (such as a teleoperated arm), lift, crane, and the like. In such embodiments, input device 135 can include a hard-wired control panel, a control pendant, or any other suitable input device configured to receive user inputs locally for target device 130. In some embodiments, target device 130 is a wirelessly controlled device, such as a video drone or semi-autonomous automobile. In such embodiments, input device 135 can include a wireless control device configured to communicate wirelessly with control unit 131, for example via network 105. In some embodiments, input device 135 may include various specialized input mechanisms for facilitating vehicle operation, such as one or more joy sticks, knobs, pedals, and the like.

Figure 2:
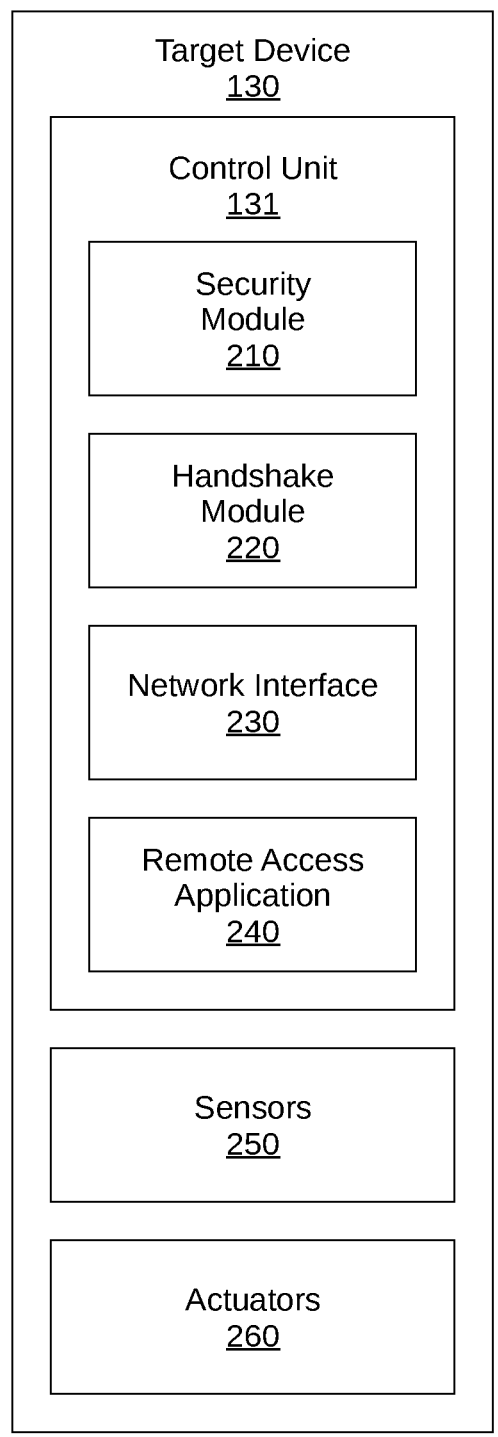
FIG. 2 is a more detailed illustration of the target device of FIG. 1, according to various embodiments.

FIG. 2 is a more detailed illustration of target device 130, according to various embodiments. As shown, target device 130 includes one or more of a security module 210, a handshake module 220, a network interface 230, a remote access application 240, sensors 250 and/or actuators 260. In the embodiment illustrated in FIG. 2, security module 210, handshake module 220, network interface 230, and remote access application 240 are included in and/or implemented as part of control unit 131. In other embodiments, one or more of security module 210, handshake module 220, network interface 230, and/or remote access application 240 is implemented as a computing device or electronic device that is separate from control unit 131. For example, in one such embodiment, network interface 230 is implemented as a separate network interface controller.

Security module 210 includes software routines that enforce applicable security standards for access to some or all functions of target device 130. For example, in some embodiments, certain functions of target device 130 may be restricted by security module 210 to a user with higher privileges than other users. In such embodiments, administer-level functions requiring higher privileges can include the ability to modify operational parameters, such as operating setpoints, and/or cause target device 130 to perform certain restricted functions, such as restarting, accessing a restricted area, and the like. A user is not enabled to perform such functions unless appropriate authentication and authorization mechanisms are performed by security module 210. In some embodiments, security module 210 further includes encryption and/or other security routines for facilitating enforcement of applicable security standards when a user operates target device 130 remotely as described herein.

Handshake module 220 includes software routines that facilitate communication between local computing device 120 and target device 130. For example, in an instance in which local computing device 120 is connected to a first network, such as a wireless network, and target device 130 is connected to a second network, such as a local area network, handshake module 220 facilitates the establishment of a network connection 102 between local computing device 120 and target device 130.

Network interface 230 is configured to communicatively couple target device 130 to network 105 and/or to another network (not shown) that communicatively couples target device 130 to network 105. In some embodiments, network interface 230 is a hardware component included in target device 130.

Remote access application 240 can be included in or implemented by control unit 131. Remote access application 240 is configured to enable various embodiments described herein. As such, remote access application 240 can be a software application, a subroutine, or an application programming interface (API). Remote access application 240 is configured to receive control signals from local computing device 120 via network connection 102, and provide a suitable signal to control unit 131 so that target device 130 performs a specific operation that is associated with the control signal. In some embodiments, remote access application 240 is further configured to transmit operating information via network connection 102 to local computing device 120. Such operating information can include setpoints or other operating parameters of target device 130 and/or one or more measurements taken by target device 130, for example via sensors 250.

Sensors 250 can include any sensors associated with operation and/or performance of target device 130, such as temperature sensors, fluid levels, power levels, and location information indicating a current location of target device 130, among others. Alternatively or additionally, in some embodiments, sensors 250 can include environmental sensors, for example for measuring a temperature proximate target device 130. Alternatively or additionally, in some embodiments, sensors 250 can include one or more sensors for determining a current state of a component of target device 130, such as a power level, whether a motor is on or off, whether a manipulator is in contact with a work piece, etc. Alternatively or additionally, in some embodiments, sensors 250 can include one or more optical sensor and/or cameras for generating visual information associated with operation of target device 130. In some embodiments, one or more of sensors 250 are configured to monitor an actuator or a status of an actuator 260 of target device 130.

Actuators 260 can include any movable components of target device 130, such as motors, solenoids, manipulator arms, rotational elements and the like. Generally, operations performed by target device 130 in response to control signals from local computing device 120 involve one or more of actuators 260.

Returning to FIG. 1, interface devices 140 are configured to present VR/AR environment 160 to a user. In the embodiment illustrated in FIG. 1, interface devices include at least one of a VR headset 141 and/or a display 142. VR headset 141 can be configured to display VR/AR environment 160 as an AR environment and/or a VR environment. Thus, in some embodiments, VR headset 141 is configured as an AR-only device, in some embodiments, VR headset 141 is configured as a VR-only device, and in some embodiments, VR headset 141 is configured to be selectively operated as either an AR device or a VR device. When a user wears VR headset 141 and VR headset 141 generates an AR environment, VR headset 141 displays AR visual elements (such access interface 161) that are superimposed on a video of the actual environment the user is facing. When a user wears VR headset 141 and VR headset 141 generates a VR environment, VR headset 141 displays VR visual elements (such access interface 161) that are incorporated into the VR environment being presented to the user.

Interaction devices 150 are devices configured to enable a user to interact with portions of AR/VR environment 160. For example, in some embodiments, interaction devices 150 include a wired glove 151 that is worn by a user. In such embodiments, the position and orientation of wired glove 151 and/or the fingers of wired glove 151 can be detected by interface devices 141. Consequently, in such embodiments, wired glove 151 or a virtual avatar of the user hand wearing wired glove 151 can be included in VR/AR environment 160, and can be shown interacting with access interface 161. Thus, a user wearing wired glove 151 can make selections and/or operate virtual input devices included in access interface 161 that enable control signals to be generated for target device 130.

In some embodiments, interaction devices 150 include any device configured to convey the position, movement and/or orientation of the interaction device 150 to interface devices 140 and/or local computing device 120. In some embodiments, an example of an interaction device 150 is a pointer or wand that includes motion-tracking sensors for determining movement and position and/or optical markers for optical detection of movement and position. In such embodiments, the pointer or wand is held by a user and can be detected and incorporated into VR/AR environment 160. Thus, the user can employ the pointer or wand to selectively interact with access interface 161. In another example, an interaction device 150 includes one or more wearable devices, such as smart rings, that each include motion-tracking sensors for determining movement and position and/or optical markers for optical detection of movement and position. In such embodiments, certain fingers of the user can be detected and therefore employed to selectively interact with access interface 161. In the embodiment illustrated in FIG. 1, interaction device 151 is depicted as wired glove 151. An embodiment of wired glove 151 is described below in conjunction with FIG. 3.

Figure 3:
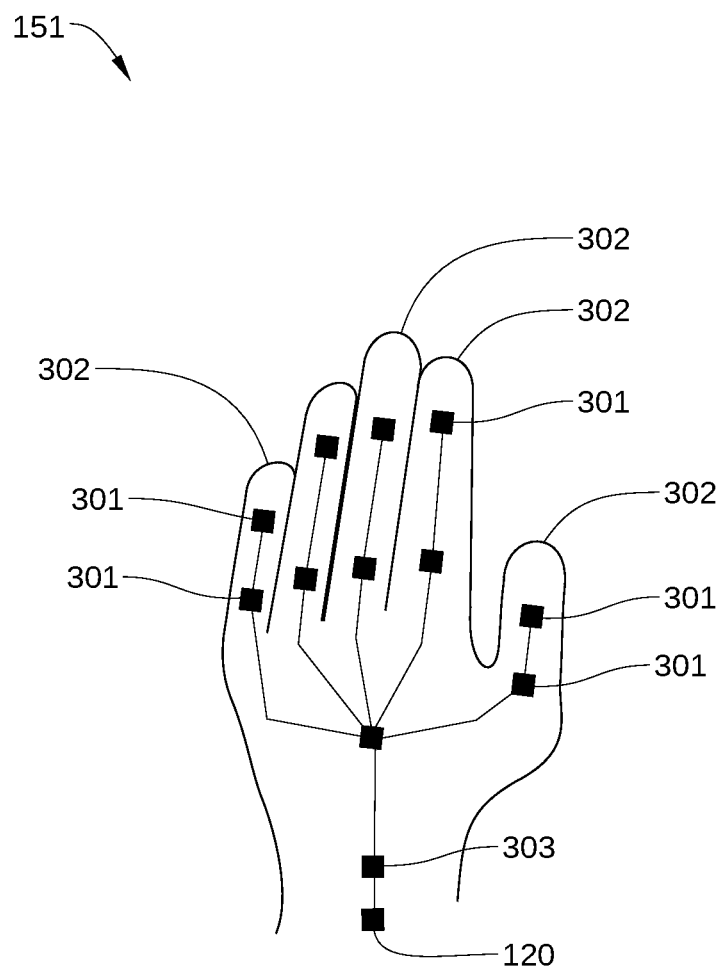
FIG. 3 is a more detailed illustration of the wired glove of FIG. 1, according to various embodiments.

FIG. 3 is a more detailed illustration of wired glove 151, according to various embodiments. Wired glove 151 is configured as a user input device for user interactions with AR/VR environment 160. As shown, wired glove 151 includes sensors 301 attached to each finger 302 of wired glove 151. In some embodiments, sensors 301 are configured to sense bending of fingers 302. Alternatively or additionally, in some embodiments, sensors 301 are configured to detect the position and/or orientation of fingers 302 and wired glove 151. Alternatively or additionally, in some embodiments, sensors 301 are configured to facilitate the detection of the position and/or orientation of fingers 302 and wired glove 151, for example via optical markings. In some embodiments, sensors 301 can include magnetic tracking devices, inertial tracking devices, and/or computer vision-based tracking devices to detect movement, position, orientation, and/or bending of fingers 302 and wired glove 151.

In some embodiments, local computing device 120 of FIG. 1 is incorporated into wired glove 151. Alternatively or additionally, in some embodiments, wired glove 151 further includes a VR/AR chip 303 for performing the computations to generate VR/AR environment 160 and/or access interface 161. In other embodiments, local computing device 120 is configured as a separate device from wired glove 151 and other interaction devices 150.

Returning to FIG. 1, local computing device 120 is a computing device that is configured to enable various embodiments described herein, and is disposed proximate elements of remote device control system 100 with which a user directly interacts. For example, local computing device 120 can be a smartphone, laptop computer, electronic tablet, wearable smart device, or other computing device that is available to a user. Alternatively, local computing device 120 can be a desktop computer that is available to the user. An embodiment of local computing device 120 is described below in conjunction with FIG. 4.

Local Computing Device

Figure 4:
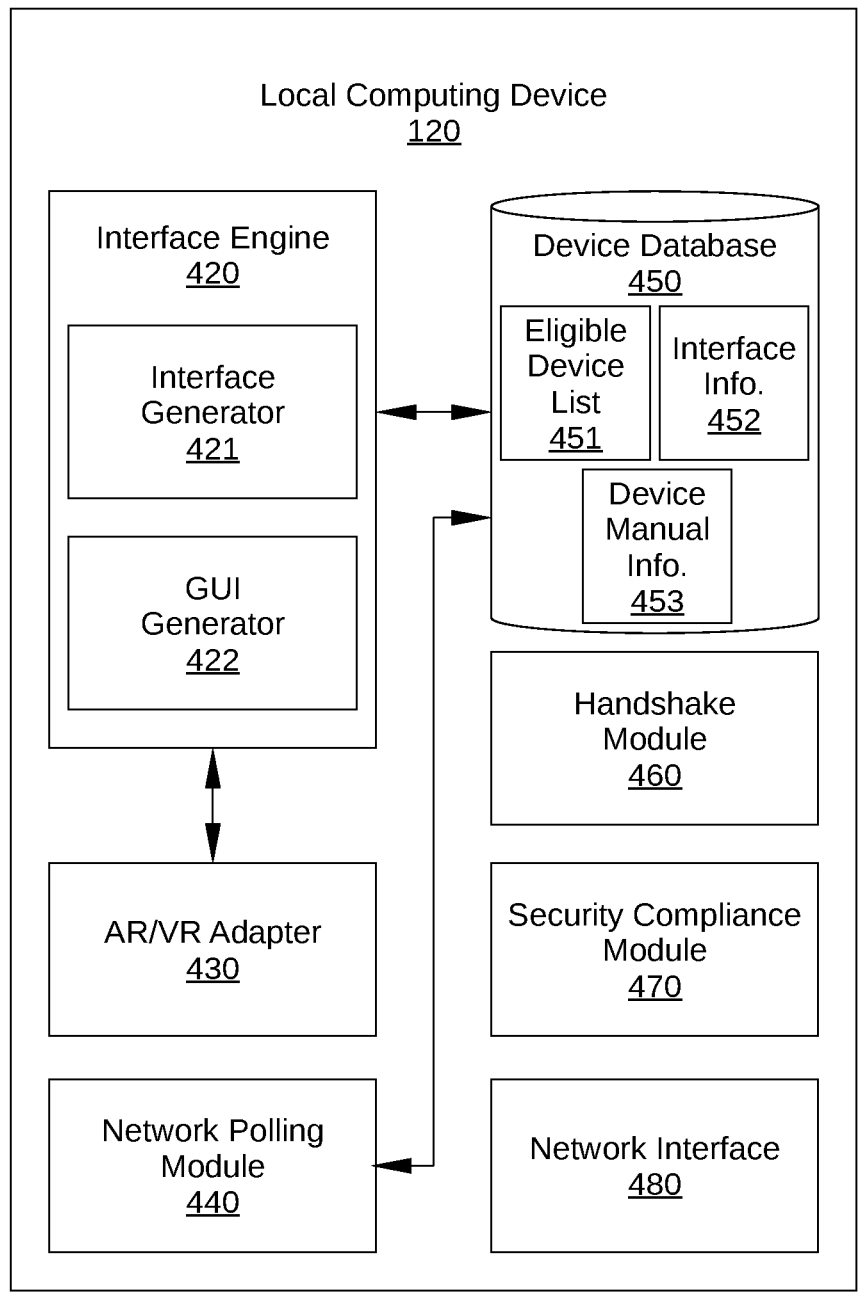
FIG. 4 is a more detailed illustration of the local computing of FIG. 1, according to various embodiments.

FIG. 4 is a more detailed illustration of local computing device 120, according to various embodiments. As shown, local computing device 120 includes one or more of an interface engine 420, an AR/VR adapter 430, a network polling module 440, a device data base 450, a handshake module 460, a security compliance module 470, and a network interface 480. In the embodiment illustrated in FIG. 4, device data base 450 is included in and/or implemented as part of local computing device 120. In other embodiments, device data base 450 is implemented externally to local computing device 120, and is accessed by local computing device 120 via network 105.

VR/AR adapter 430 is configured to generate VR/AR environment 160, for example in a suitable interface device 140. As such, in some embodiments, VR/AR adapter 430 is configured to incorporate access interface 161 into VR/AR environment 160 when access interface 161 is generated by interface engine 420. VR/AR adapter 430 is further configured to incorporate interaction devices 150 into VR/AR environment 160 when detected, for example by one of interface devices 140 and/or by other sensors monitoring the environment proximate interface devices 140.

Network polling module 440 is configured to poll network 105 and/or other networks connected thereto for eligible devices that can be controlled via access interface 161 as a target device 130. Generally, eligible devices include devices that are connected to network 105 and are suitably configured to receive a control signal from local computing device 120 and perform an operation indicated by the control signal. For example, in some embodiments, devices that are eligible to be a target device 130 are configured with a remote access application 240 as shown in FIG. 2. In some embodiments, a list of eligible devices 451 is included in device database 450.

Device database 450 includes device-specific information that enables operation of interface engine 420 and/or network polling module 440. In some embodiments, device database 450 includes eligible device list 451, interface information 452, and/or device manual information 453. Eligible device list 451 includes a list of devices that are known to be configured with remote access application 240 and therefore can be selected as a target device 130 by a user via access interface 161. In some embodiments, eligible device list 451 further includes a list of devices can be updated to include remote access application 240, and therefore can be selected as a target device 130 once updated. Interface information 452 includes information that enables interface engine 420 to generate a suitable configuration of access interface 161 for a particular target device 130. In some embodiments, interface information 452 includes operations and/or measurements that can be performed by the particular target device 130. In some embodiments, interface information 452 includes one or more setpoints and/or other operating parameters of the particular target device 130. In some embodiments, interface information 452 includes interface formatting information for the particular target device 130, such as what type of controls are included in access interface 161 for operation of the particular target device 130 and how such controls are configured or laid out relative to each other within access interface 161. In such embodiments, different control types can include virtual buttons, dials, joysticks, levers, switches, and the like. In some embodiments, device manual information 453 includes operating manual information for teaching or reminding a user how to operate the particular target device 130.

Handshake module 460 includes software routines that facilitate communication between local computing device 120 and target device 130. For example, in an instance in which local computing device 120 is connected to a first network, such as a wireless network, and target device 130 is connected to a second network, such as a local area network, handshake module 420 facilitates the establishment of a network connection 102 between local computing device 120 and target device 130, for example by communicating with handshake module 220 (shown in FIG. 2) of target device 130.

Security compliance module 470 includes software routines that enforce applicable security standards for accessing some or all functions of target device 130. Generally, security compliance module 470 interacts with security module 210 (shown in FIG. 2) of target device 130.

Network interface 480 is configured to communicatively couple local computing device 120 to network 105 and/or to another network (not shown) that communicatively couples local computing device 120 to network 105. In some embodiments, network interface 480 is a hardware component included in local computing device 120.

Interface engine 420 is configured to generate an access interface 161 that enables a user to detect, select, and interact with a specific target device 130 via VR/AR environment 160 (access interface 161 and VR/AR environment 160 are shown in FIG. 1). Interface engine 420 includes an interface generator 421 and a graphical user interface (GUI) generator 422. Interface generator 421 determines and configures content to be included in access interface 161, for example based on interface information 452 from device database 450. GUI generator 422 then generates a GUI that includes the interface content determined and configured by interface generator 420. The GUI so generated is incorporated into access interface 161, for example by VR/AR adapter 430.

In some embodiments, interface engine 420 is configured to determine what type of virtual environment to present to a user based on one or more features of local computing device 120. For example, when interface engine 420 determines that local computing device 120 is of sufficient computational power, interface engine 420 presents a VR environment to the user. Otherwise, interface engine 420 presents an AR environment to the user. In either case, access interface 161 is presented to the user in some sort of virtual environment. One embodiment of access interface 161 is illustrated in FIG. 5.

Access Interface

Figure 5:
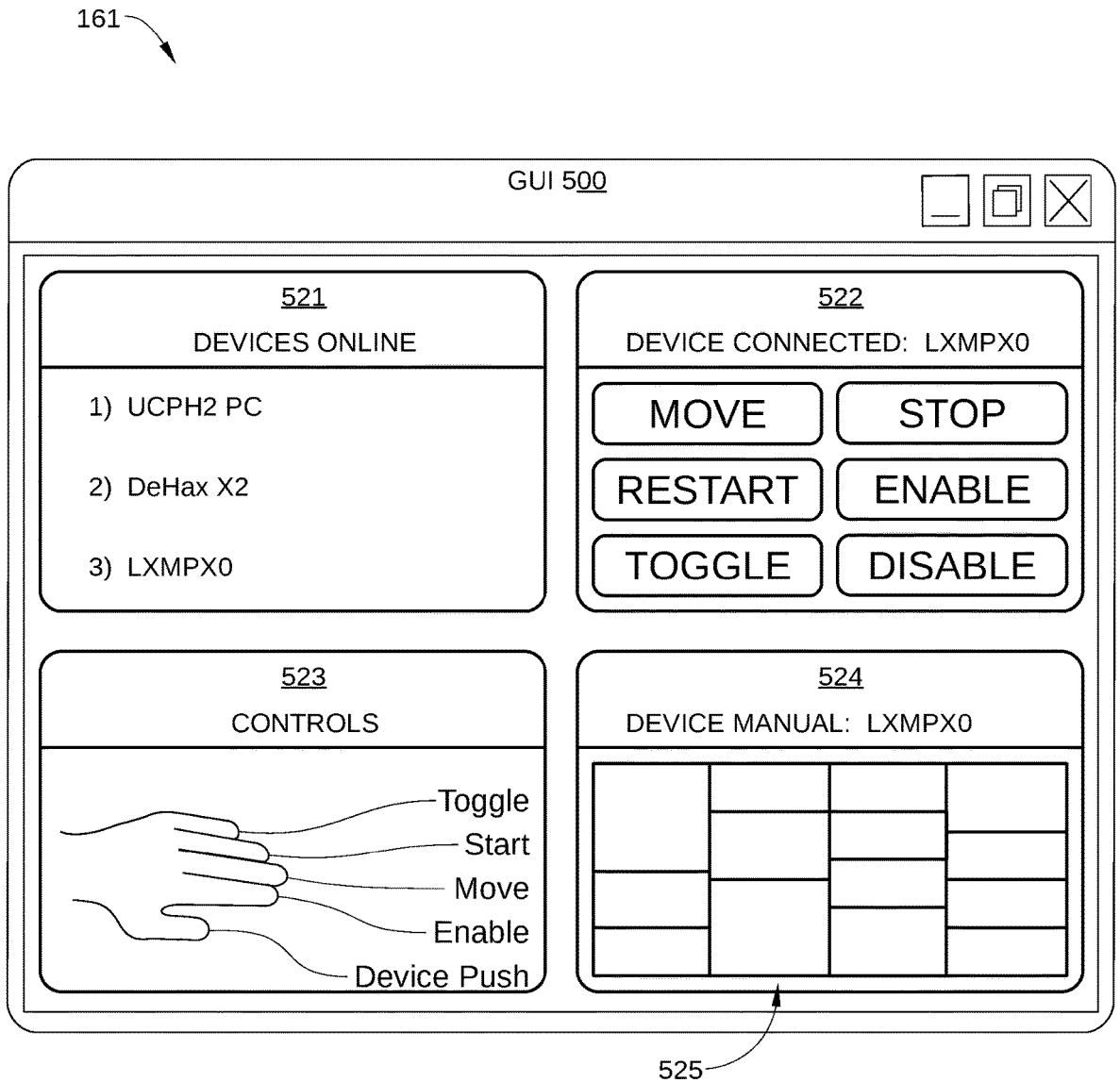
FIG. 5 is a more detailed illustration of the access interface of FIG. 1, according to various embodiments.

FIG. 5 is a more detailed illustration of access interface 161, according to various embodiments. In the embodiment illustrated in FIG. 5, access interface 161 includes a virtual GUI 500 with multiple windows (referred to collectively herein as "windows 520"): an available devices window 521, a device command window 522, an interaction device window 523, and a device manual window 524. In alternative embodiments, access interface 161 displays a single one of windows 520 or a combination of two or more of windows 520. According to various embodiments, access interface 161 is implemented as virtual GUI 500, and is displayed in VR/AR environment 160 to enable a user to detect, select, and interact with a specific target device 130 via VR/AR environment 160.

Available devices window 521 displays devices that are currently detected by network polling module 440 and are eligible to be remotely controlled as a target device 130. Device command window 522 displays various commands that can be selected to remotely operate target device 130. In some embodiments, the contents of device command window 522 are defined based on interface information 452 from device database 450. Thus, in such embodiments, the specific commands that are displayed, the type of virtual controls provided for each command (button, switch, knob, three-dimensional joystick, etc.), and the layout of the virtual controls are based on what specific target device 130 is currently connected to local computing device 120. Interaction device window 523 displays commands associated with the interaction device 150 that is detected and incorporated into VR/AR environment 160. For example, in addition to or in lieu of the virtual controls included in device command window 522, certain commands for the current target device 130 can be implemented by a user via movement or gesturing with specific portions (e.g., fingers) of an interaction device 150. Device manual window 524 displays user manual information for the current target device 130, such as user operating instructions for the current target device 130. In some embodiments, device manual window 524 includes a plurality of menu items 525 that can each be selected and/or expanded by a user via interaction device 150.

Remote Control of Target Device Via Virtual Interface

FIG. 6 sets forth a flowchart of method steps for controlling a device via a virtual interface, according to various embodiments. Although the method steps are described in conjunction with the systems of FIGS. 1-5, persons skilled in the art will understand that any system configured to perform the method steps, in any order, is within the scope of the embodiments.

As shown, a method 600 begins at step 601, where interface engine 420 determines what local computing device 120 or devices are available to generate a virtual environment, such as VR/AR environment 160. For example, in some embodiments, the local computing device 120 determined to be available in step 601 may be included in an interaction device 150, such as a wired glove 151. As such, due to power and size limitations, the computational power of the local computing device 120 may be insufficient to implement VR/AR environment 160 as a VR environment, but sufficient to implement VR/AR environment 160 as an AR environment. Alternatively or additionally, in some embodiments, a local computing device 120 available in step 601 may be included in a separate computing device, such as a smartphone, laptop, wearable smart device, and the like. In the case of a smartphone, laptop, and certain other computing devices, local computing device 120 generally includes sufficient computational power to implement VR/AR environment 160 as a VR environment.

In step 602, interface engine 420 selects the virtual environment to be presented to the user. In some embodiments, interface engine 420 selects a VR environment to present to the user when a local computing device 120 of sufficient computational power is determined to be available in step 601. In such embodiments, interface engine 420 otherwise selects an AR environment to present to the user.

In step 603, interface engine 420 generates the virtual environment selected in step 602. In some embodiments, interface generator 421 further generates a suitable interface for a user to interact with VR/AR environment 160, such as access interface 161. In some embodiments, access interface 161 includes a window that notifies a user of eligible devices, such as available devices window 521, and/or enables a user to begin searching for eligible devices on network 105.

In step 604, interface engine 420 polls network 105 for eligible devices that can be remotely controlled as a target device 130, for example using network polling module 440. In some embodiments, interface engine 420 initiates polling of network 105 in step 604 automatically, and in other embodiments in response to a user input via access interface 161.

In step 605, interface engine 420 receives eligible device information from network 105 that indicates one or more eligible devices that can be remotely controlled as a target device 130.

In step 606, interface engine 420 causes an indicator to be displayed to the user in VR/AR environment 160 for each eligible device included in eligible device information received in step 605. In some embodiments, the indicators are displayed in available devices window 521 of access interface 161.

In step 607, interface engine 420 receives a user selection of a target device from VR/AR environment 160. For example, in some embodiments, when a user selects a specific eligible device in available devices window 521 using an interaction device 150, interface engine 420 receives the user selection from VR/AR environment 160.

In step 608, interface engine 420 initiates a network connection with the target device 130 selected in step 607. For example, in some embodiments, handshake module 460 of local computing device 120 interacts with handshake module 220 of target device 130.

In step 609, interface engine 420 performs authorization and/or authentication procedures with the target device 130. For example, in some embodiments, security compliance module 470 of local computing device 120 interacts with security module 210 of target device 130. In some embodiments, in step 609 an authorization level is determined for the user that limits what specific operations the user can cause target device 130 to perform and/or what information the user can query from target device 130.

In step 610, interface engine 420 receives a user control input via access interface 161, such as when a user selects a particular command from device command window 522 of access interface 161. In some embodiments, for the user to cause target device 130 to perform a particular operation, the user generates a control input via a suitable virtual control from device command window 522 that corresponds to that particular operation. In some embodiments, the user generates the control input using an interaction device 150 in VR/AR environment 160.

In step 611, interface engine 420 determines a control signal that corresponds to the control input received from access interface 161. In some embodiments, interface engine 420 determines the control signal based on the control input received in step 610 and on information included in interface information 452.

In step 612, interface engine 420 sends the control signal selected in step 611 to target device 130 via network 105. Upon receipt of the control signal, remote access application 240 determines the operation to be performed, and control unit 131 of target device 130 causes target device 130 to perform the operation.

In step 620, interface engine 420 receives a user query input via access interface 161, such as when a user selects a particular command from device command window 522 that is associated with a request for certain information from target device 130. In some embodiments, for the user the user to request a value measured by a sensor 250 of target device 130, the user generates a query input via a suitable virtual control from device command window 522 that corresponds to a data request operation. In some embodiments, the user generates the query input using an interaction device 150 in VR/AR environment 160.

In some embodiments, the requested value includes one or more measured value, such as values measured by one or more sensors 250 of target device 130. In some embodiments, the requested value includes a value of one or more operating parameters of target device 130, such as setpoints, information indicating a state of target device 130, and the like. In such embodiments, a setpoint and/or information indicating a state of target device 130 may be measured by one or more sensors 250 of target device 130.

In step 621, interface engine 420 determines a query signal that corresponds to the query input received from access interface 161. In some embodiments, interface engine 420 determines the query signal based on the query input received in step 620 and on information included in interface information 452.

In step 622, interface engine 420 sends the query signal selected in step 621 to target device 130 via network 105. Upon receipt of the query signal, remote access application 240 determines the measured value or operating information to be sent to local computing device 120. Control unit 131 of target device 130 causes target device 130 to retrieve the requested measured value or operating information and transmit the measured value as a query response via network connection 102.

In step 623, interface engine 420 receives the query response from target device 130.

Use Case

In some embodiments, remote device control system 100 enables a user to remotely control and/or otherwise interact with a target device 130 that is difficult or impossible for the user to physically access. In one such embodiment, the user is an astronaut wearing a space suit that includes an interaction device 150. For example, a wired glove 151 can be incorporated into a glove and/or arm of the space suit. Alternatively, the user can be an unsuited astronaut who is disposed in a separate environment from target device 130 and has access to a suitable interaction device 150. In the embodiment, target device 130 can be a device that is controllable by a user via a network connection, such as an oxygen generator, a solar panel array, a power turbine, a satellite, or the like, and may be separate from whatever space vehicle the user currently occupies. As a result, target device 130 is only physically accessible via extravehicular activity, which is time-consuming and dangerous. However, via remote device control system 100, the user can perform operations on or with target device 130, even though physical access to target device 130 is difficult or impossible for the user attain.

Exemplary Computing Device

FIG. 7 is a block diagram of a computing device 700 configured to implement one or more aspects of the various embodiments. Thus, computing device 700 can be a computing device associated with local computing device 120, target device 130, interface devices 140, and/or interaction devices 150. Computing device 700 may be a desktop computer, a laptop computer, a tablet computer, or any other type of computing device configured to receive input, process data, generate control signals, and display images. Computing device 700 is configured to run remote access application 240, interface engine 420, network polling module 440, and/or other suitable software applications, which can reside in a memory 710. It is noted that the computing device described herein is illustrative and that any other technically feasible configurations fall within the scope of the present disclosure.

As shown, computing device 700 includes, without limitation, an interconnect (bus) 740 that connects a processing unit 750, an input/output (I/O) device interface 760 coupled to input/output (I/O) devices 780, memory 710, a storage 730, and a network interface 770. Processing unit 750 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 750 may be any technically feasible hardware unit capable of processing data and/or executing software applications, including remote access application 240, interface engine 420, and/or network polling module 440. Further, in the context of this disclosure, the computing elements shown in computing device 700 may correspond to a physical computing system (e.g., a system in a data center) or may be a virtual computing instance executing within a computing cloud.

I/O devices 780 may include devices capable of providing input, such as a keyboard, a mouse, a touch-sensitive screen, and so forth, as well as devices capable of providing output, such as a display device 781. Additionally, I/O devices 780 may include devices capable of both receiving input and providing output, such as a touchscreen, a universal serial bus (USB) port, and so forth. I/O devices 780 may be configured to receive various types of input from an end-user of computing device 700, and to also provide various types of output to the end-user of computing device 700, such as one or more graphical user interfaces (GUI), displayed digital images, and/or digital videos. In some embodiments, one or more of I/O devices 780 are configured to couple computing device 700 to a network 705.

Memory 710 may include a random access memory (RAM) module, a flash memory unit, or any other type of memory unit or combination thereof. Processing unit 750, I/O device interface 760, and network interface 770 are configured to read data from and write data to memory 710. Memory 710 includes various software programs that can be executed by processor 750 and application data associated with said software programs, including remote access application 240, interface engine 420, and/or network polling module 440.

In sum, the embodiments provide techniques for a user to remotely control and interact with a target device via a virtual interface. The virtual interface includes virtual input controls that are tailored to a specific target device. The virtual input controls enable the user to cause the target device to perform certain functions or operations in response to selections made by the user with input controls. Further, the virtual interface enables the user to detect and select a specific target device that is connected to a network.

At least one technical advantage of the disclosed techniques relative to the prior art is that the disclosed techniques enable a user to remotely control a target device without having to possess a specialized controller for the target device or have access to an input console for the target device. Another advantage of the disclosed techniques is that the user can receive information associated with the target device without possessing a specialized controller for the target device or having access to an input console for the target device. Such information can include setpoints or other operational parameters for the target device and/or measurements performed by the target device. These technical advantages represent one or more technological improvements over prior art approaches.

1. In some embodiments, a computer-implemented method for controlling a target device via a virtual interface includes: receiving a control input from a virtual interface; determining a control signal based on the control input for an operation to be performed by a first device that is configured to be controlled wirelessly; and transmitting the control signal to the first device to cause the first device to perform the operation.

2. The computer-implemented method of clause 1, wherein the virtual interface generates the control input in response to a user interaction with the virtual interface that is associated with the operation.

3. The computer-implemented method of clauses 1 or 2, further comprising, prior to receiving the control input from the virtual interface: polling a network for one or more devices that are configured to be controlled wirelessly; and receiving information indicating that the one or more devices can be connected to the virtual interface via the network.

4. The computer-implemented method of any of clauses 1-3, further comprising, causing a unique indicator to be displayed via the virtual interface for each device included in the one or more devices based on the information received.

5. The computer-implemented method of any of clauses 1-4, wherein the first device is included in the one or more devices, and further comprising: receiving a user selection of the first device via the virtual interface; and initiating a network connection with the first device in response to the user selection.

6. The computer-implemented method of any of clauses 1-5, wherein the user selection of the first device is based on the unique indicator corresponding to the first device.

7. The computer-implemented method of any of clauses 1-6, further comprising: receiving a query input from the virtual interface; and transmitting a query signal based on the query input to the first device for one of operating information associated with the first device or a value measured by a sensor that is associated with the first device.

8. The computer-implemented method of any of clauses 1-7, wherein the virtual interface generates the query input in response to a user interaction with the virtual interface.

9. The computer-implemented method of any of clauses 1-8, wherein the user interaction in the virtual interface is performed with an interaction device.

10. The computer-implemented method of any of clauses 1-9, further comprising receiving from the first device, in response to the query signal, one of the operating information associated with the first device or the value measured by the sensor that is associated with the first device.

11. A non-transitory computer readable medium storing instructions that, when executed by a processor, cause the processor to perform the steps of: receiving a control input from a virtual interface; determining a control signal based on the control input for an operation to be performed by a first device that is configured to be controlled wirelessly; and transmitting the control signal to the first device to cause the first device to perform the operation.

12. The non-transitory computer readable medium of clause 11, further storing instructions that, when executed by a processor, cause the processor to perform the steps of: determining a computing device that is available to generate the virtual interface; and determining a type of interface for the virtual interface based on the computing device, wherein the type of interface comprises one of an augmented reality interface or a virtual reality interface.

13. The non-transitory computer readable medium of clauses 11 or 12, further storing instructions that, when executed by a processor, cause the processor to perform the steps of, prior to receiving the input from the virtual interface: determining a portion of the virtual interface to display based on device-specific information associated with the first device; and causing the portion of the virtual interface to be displayed.

14. The non-transitory computer readable medium of any of clauses 11-13, wherein the device-specific information associated with the first device is included in a database of information for a plurality of devices, wherein each of the plurality of devices is configured to be controlled wirelessly.

15. The non-transitory computer readable medium of any of clauses 11-14, wherein the device-specific information includes at least one of operations that can be performed by the first device, user operating instructions for the first device, or virtual control information for the first device.

16. The non-transitory computer readable medium of any of clauses 11-15, wherein the virtual interface generates the control input in response to a user interaction with the virtual interface that is associated with the operation.

17. The non-transitory computer readable medium of any of clauses 11-16, further storing instructions that, when executed by a processor, cause the processor to perform the steps of, prior to receiving the control input from the virtual interface: polling a network for one or more devices that are configured to be controlled wirelessly; and receiving information indicating that the one or more devices can be connected to the virtual interface via the network.

18. The non-transitory computer readable medium of any of clauses 11-17, further storing instructions that, when executed by a processor, cause the processor to perform the step of causing a unique indicator to be displayed via the virtual interface for each device included in the one or more devices based on the information received.

19. The non-transitory computer readable medium of any of clauses 11-18, wherein the first device is included in the one or more devices, and further storing instructions that, when executed by a processor, cause the processor to perform the steps of: receiving a user selection of the first device via the virtual interface; and initiating a network connection with the first device in response to the user selection.

20. A system, comprising: a memory that stores instructions; and a processor that is coupled to the memory and is configured to perform the steps of, upon executing the instructions: receiving a control input from a virtual interface; determining a control signal based on the control input for an operation to be performed by a first device that is configured to be controlled wirelessly; and transmitting the control signal to the first device to cause the first device to perform the operation.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling a first device, the method comprising:
   displaying an access interface within a virtual reality or augmented reality environment, wherein the access interface includes a first window that visually depicts a first association between at least one of a physical position or a physical orientation of a first portion of an interaction device and a first operation that movably actuates at least a portion of the first device simultaneously with (ii) a second association between at least one of a physical position or a physical orientation of a second portion of the interaction device and a second operation that is different from the first operation;
   determining, based on at least one of the first of association or the second association and at least one of the physical position or the physical orientation of at least one of the first portion or the second portion of interaction device, a control signal, wherein the control signal indicates an operation to be performed by the first device; and
   transmitting the control signal to the first device to cause the first device to perform the operation.

2. The computer-implemented method of claim 1, further comprising, prior to determining the control signal:
   polling a network for one or more devices that are configured to be controlled wirelessly; and
   receiving information indicating that the one or more devices can be connected to the access interface via the network.

3. The computer-implemented method of claim 2, further comprising, causing a unique indicator to be displayed via the access interface for each device included in the one or more devices based on the information received.

4. The computer-implemented method of claim 3, wherein the first device is included in the one or more devices, and further comprising:
   receiving a user selection of the first device via the access interface; and
   initiating a network connection with the first device in response to the user selection.

5. The computer-implemented method of claim 4, wherein the user selection of the first device is based on the unique indicator corresponding to the first device.

6. The computer-implemented method of claim 1, further comprising:
   receiving a query input from the access interface; and
   transmitting a query signal based on the query input to the first device for one of operating information associated with the first device or a value measured by a sensor that is associated with the first device.

7. The computer-implemented method of claim 6, wherein the access interface generates the query input in response to a user interaction with the access interface.

8. The computer-implemented method of claim 7, wherein the user interaction in the access interface is performed with the interaction device.

9. The computer-implemented method of claim 6, further comprising receiving from the first device, in response to the query signal, one of the operating information associated with the first device or the value measured by the sensor that is associated with the first device.

10. One or more non-transitory computer readable media storing instructions that, when executed by one or more processors, cause the one or more processors to perform the steps of:
    displaying an access interface within a virtual reality or augmented reality environment, wherein the access interface includes a first window that visually depicts a first association between at least one of a physical position or a physical orientation of a first portion of an interaction device and a first corresponding operation that movably actuates at least a portion of the first device simultaneously with (ii) a second association between at least one of a physical position or a physical orientation of a second portion of the interaction device and a second operation that is different from the first operation;
    determining, based on at least one of the first association or the second association and at least one of the physical position or the physical orientation of at least one of the first portion or the second portion of interaction device, a control signal, wherein the control signal indicates an operation to be performed by the first device; and
    transmitting the control signal to the first device to cause the first device to perform the operation.

11. The one or more non-transitory computer readable media of claim 10, further storing instructions that, when executed by the processor, cause the processor to perform the steps of:
    determining a computing device that is available to generate the access interface; and
    determining a type of interface for the access interface based on the computing device,
    wherein the type of interface comprises one of an augmented reality interface or a virtual reality interface.

12. The one or more non-transitory computer readable media of claim 10, further storing instructions that, when executed by the processor, cause the processor to perform the steps of, prior to determining the control signal:
  determining a portion of the access interface to display based on device-specific information associated with the first device; and
  causing the portion of the access interface to be displayed.

13. The one or more non-transitory computer readable media of claim 12, wherein the device-specific information associated with the first device is included in a database of information for a plurality of devices, wherein each of the plurality of devices is configured to be controlled wirelessly.

14. The one or more non-transitory computer readable media of claim 12, wherein the device-specific information includes at least one of operations that can be performed by the first device, user operating instructions for the first device, or virtual control information for the first device.

15. The one or more non-transitory computer readable media of claim 10, further storing instructions that, when executed by the processor, cause the processor to perform the steps of, prior to determining the control signal:
  polling a network for one or more devices that are configured to be controlled wirelessly; and
  receiving information indicating that the one or more devices can be connected to the access interface via the network.

16. The one or more non-transitory computer readable media of claim 15, further storing instructions that, when executed by the processor, cause the processor to perform the step of causing a unique indicator to be displayed via the access interface for each device included in the one or more devices based on the information received.

17. The one or more non-transitory computer readable media of claim 16, wherein the first device is included in the one or more devices, and further storing instructions that, when executed by the processor, cause the processor to perform the steps of:
  receiving a user selection of the first device via the access interface; and
  initiating a network connection with the first device in response to the user selection.

18. A system, comprising:
one or more memories that store instructions; and
one or more processors that are coupled to the one or more memories and are configured to perform the steps of, upon executing the instructions:
  displaying an access interface within a virtual reality or augmented reality environment, wherein the access interface includes a first window that visually depicts a first association being between at least one of a physical position or a physical orientation of a first portion of an interaction device and a first operation that movably actuates at least a portion of the first device simultaneously with (ii) a second association between at least one of a physical position or a physical orientation of a second portion of the interaction device and a second operation that is different from the first operation,
  determining, based on at least one of the first association or the second association and at least one of the physical position or the physical orientation of at least one of the first portion or the second portion of interaction device, a control signal, wherein the control signal indicates an operation to be performed by the first device, and
  transmitting the control signal to the first device to cause the first device to perform the operation.

* * * * *

UNITED STATES PATENT AND TRADEMARK OFFICE
CERTIFICATE OF CORRECTION

PATENT NO. : 11,567,571 B2
APPLICATION NO. : 16/867497
DATED : January 31, 2023
INVENTOR(S) : Keshav Prasad Kuruva It is certified that error appears in the above-identified patent and that said Letters Patent is hereby corrected as shown below:

In the Claims

Column 15, Claim 1, Line 41, please insert --(i)-- after depicts;

Column 15, Claim 1, Line 50, please delete "of" after first;

Column 16, Claim 10, Line 37, please insert --(i)-- after depicts;

Column 16, Claim 10, Line 40, please delete "corresponding" after first;

Column 18, Claim 18, Line 14, please insert --(i)-- after depicts;

Column 18, Claim 18, Line 15, please delete "being" alter association.

Signed and Sealed this
Ninth Day of May, 2023

Katherine Kelly Vidal
*Director of the United States Patent and Trademark Office*